(12) United States Patent
Catanzaro et al.

(10) Patent No.: US 6,332,978 B1
(45) Date of Patent: Dec. 25, 2001

(54) APPARATUS FOR REDUCING NITRATE CONCENTRATION IN WASTEWATER

(75) Inventors: Michael David Catanzaro, Baton Rouge; Christopher Edward Cox, Denham Springs; Raleigh Lee Cox, Baton Rouge, all of LA (US)

(73) Assignee: Delta Environmental Products, Inc., Denham Springs, LA (US)

( * ) Notice: Subject to any disclaimer, the term of this patent is extended or adjusted under 35 U.S.C. 154(b) by 0 days.

(21) Appl. No.: 09/481,462

(22) Filed: Jan. 11, 2000

(51) Int. Cl.[7] ...................................................... C02F 3/20
(52) U.S. Cl. .......................... 210/96.1; 210/139; 210/143; 210/195.3; 210/221.2
(58) Field of Search .................................... 210/614, 96.1, 210/138, 139, 143, 195.3, 220, 221.2

(56) References Cited

U.S. PATENT DOCUMENTS

| | | | |
|---|---|---|---|
| 4,130,481 | * | 12/1978 | Chase et al. ........................ 210/96.1 |
| 4,246,111 | * | 1/1981 | Savard et al. ........................ 210/96.1 |
| 5,266,200 | * | 11/1993 | Reid ...................................... 210/614 |
| 5,624,562 | * | 4/1997 | Scroggins ........................... 210/195.3 |
| 5,714,061 | * | 2/1998 | Guy et al. .......................... 210/195.3 |

* cited by examiner

Primary Examiner—Peter A. Hruskoci
(74) Attorney, Agent, or Firm—Jones, Walker, Waechter, Poitevent, Carrere & Denegre, LLP

(57) ABSTRACT

The present invention is a method for reducing the nitrate concentration in wastewater within a wastewater treatment apparatus configured to define an aeration zone and a quiescent zone. The method comprises the step of ceasing airflow into the aeration zone for a predetermined time period or until the dissolved oxygen level within the wastewater has reached a predetermined threshold. The method may also comprise the step of mixing the wastewater in the aeration zone to prevent suspended particles within the wastewater in the aeration zone from settling and to avoid substantially disturbing the quiescence of the quiescent zone.

14 Claims, 4 Drawing Sheets

APPARATUS FOR REDUCING NITRATE CONCENTRATION IN WASTEWATER

BACKGROUND OF THE INVENTION

1. Field of the Invention

This invention relates to the treatment of wastewater, namely a method for reducing nitrate concentration in wastewater.

2. Background

Wastewater is treated to remove its bacterial nutrients, principally biochemical oxygen demand (BOD). BOD is degraded by bacteria primarily by consuming dissolved oxygen (DO) to assist in metabolizing the BOD (aerobic metabolism). Oxygen is provided in treatment systems by aeration. In an oxygen depleted environment when DO levels in the wastewater are sufficiently reduced (anoxic environment), bacteria readily metabolize nitrates in the wastewater. Nitrate reduction by bacteria, however, is generally inefficient in the presence of oxygen. Bacteria capable of functioning in oxygen-rich and oxygen-poor environments will preferably metabolize nutrients aerobically.

If an anoxic environment is maintained for a sufficient time period, nitrate levels within the wastewater can be substantially reduced because bacteria will be forced to consume nitrates as a food source resulting in reduced nitrate concentrations in the effluent (outgoing water). This process is referred to as de-nitrification.

New environmental regulations are requiring reduction in nitrate levels in the effluent from wastewater treatment systems. Several methods, such as those disclosed in U.S. Pat. Nos. 5,582,734 and 4,663,044 discuss possible solutions to nitrate removal in large municipal and commercial wastewater treatment plants. These solutions are inapplicable to relatively small, self-contained wastewater treatment systems that are employed throughout the United States for treatment of wastewater. The small self-contained systems serve wastewater sources that include single family dwellings located in areas not served by municipal sewerage systems. Like larger commercial and municipal treatment systems, these smaller systems are becoming subjected to stricter nitrate removal regulations and encounter treatment problems when attempting to reduce nitrate levels in the wastewater. Unfortunately, no practical solution has been provided that will effectively solve the problems encountered by the small, self-contained systems.

ADVANTAGES AND OBJECTS OF THE INVENTION

The methods of the present invention provide a solution for small, self-contained wastewater treatment systems and work without interruption of flow into the systems. The present invention works with existing and new systems without additional substantial expense and effort and provides methods for effective nitrate reduction in the effluent from the small, self-contained systems.

With the aforementioned considerations in mind, it is therefore an object of this invention to provide a method for reducing nitrate levels in wastewater.

It is a further object of this invention to provide a safe and economical method of reducing nitrate concentration in wastewater that can be used with existing wastewater treatment systems.

It is a further object of the present invention to provide a method for reducing nitrate concentration in wastewater that can be implemented during a continuous wastewater flow situation.

It is a further object of the present invention to provide a method of reducing nitrate concentration in wastewater wherein the method is activated during periods of heavy diurnal flow.

It is a further object of the present invention to provide a method of reducing nitrate concentration in wastewater wherein the method is activated by a change in the dissolved oxygen level in the wastewater.

These and other advantages and objects of this invention shall become apparent from the ensuing description of the invention.

SUMMARY OF THE INVENTION

The present invention comprises apparatuses and method for reducing the nitrate concentrations in wastewater.

The present invention comprises a method for reducing nitrate concentration in wastewater in a wastewater treatment apparatus configured to define an aeration zone and a quiescent zone, wherein wastewater may continuously flow into the aeration zone. The wastewater treatment apparatus further comprises at least one gas outlet positioned within the aeration zone to provide gas flow into the aeration zone when wastewater is present in the aeration zone. The method comprises the step of ceasing gas flow into the aeration zone for a predetermined nitrate reduction period.

The present invention is also a method comprising the steps of ceasing gas flow into the aeration zone during periods of heavy flow and intermittently mixing the wastewater within the aeration zone.

The present invention also comprises a method for reducing the nitrate concentration in wastewater wherein the wastewater apparatus further comprises a dissolved oxygen monitor positioned to monitor the dissolved oxygen levels of the wastewater in the aeration zone. The method comprises the steps of: (a) monitoring the dissolved oxygen level in the aeration zone; (b) ceasing gas flow into the aeration zone when a predetermined dissolved oxygen level has been reached; and, (c) resuming gas flow into the aeration zone when a second predetermined threshold has been reached or a certain period of time has elapsed.

The present invention also comprises a method for reducing nitrate concentration in wastewater in a wastewater treatment apparatus wherein the method comprises the steps of: (a) monitoring the dissolved oxygen level in the aeration zone; (b) ceasing gas flow into the aeration zone when a predetermined dissolved oxygen level has been reached; and, (c) mixing the wastewater in the aeration zone.

The present invention also comprises a wastewater treatment apparatus configured to have an aeration zone and a quiescent zone. The apparatus comprises (a) at least one gas outlet positioned in the aeration zone and fluidly connected to a source of gas; (b) a dissolved oxygen probe positioned in the aeration zone; and, (c) a first controller adapted to regulate gas flow from the source of gas wherein the dissolved oxygen probe provides a dissolved oxygen measurement that is input to the first controller. The present invention also comprises a wastewater treatment apparatus configured to define an aeration zone and a quiescent zone. The apparatus comprises (a) one or more gas outlets positioned in the aeration zone; (b) a timer adapted to regulate gas flow from a source of gas to the gas outlets; (c) a repeat cycle timer adapted to regulate gas flow from the source of gas to the gas outlets, whereby when the timer suspends gas flow into the gas outlets, the repeat cycle timer permits gas flow to the gas outlets at predetermined mixing intervals for predetermined mixing periods.

DETAILED DESCRIPTION OF PREFERRED EMBODIMENTS OF THE INVENTION

Illustrations of construction, design, and methods of operation of the invention are set forth below with specific references to the Figures. However, the inventors do not intend to limit the scope of the invention to these embodiments.

Figure 1:
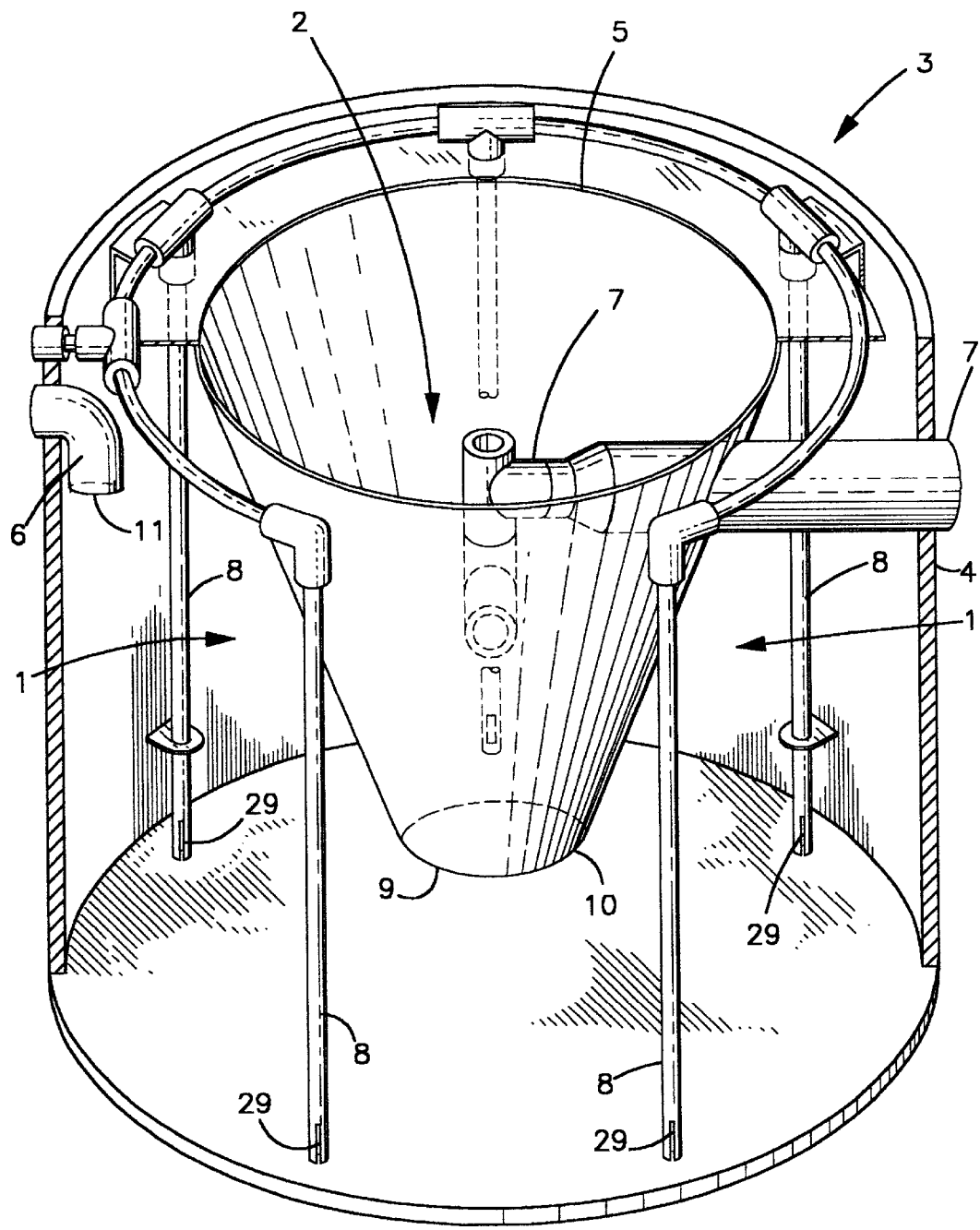
FIG. 1 illustrates a wastewater treatment apparatus that may be used with the methods of the present invention.
Figure 2:
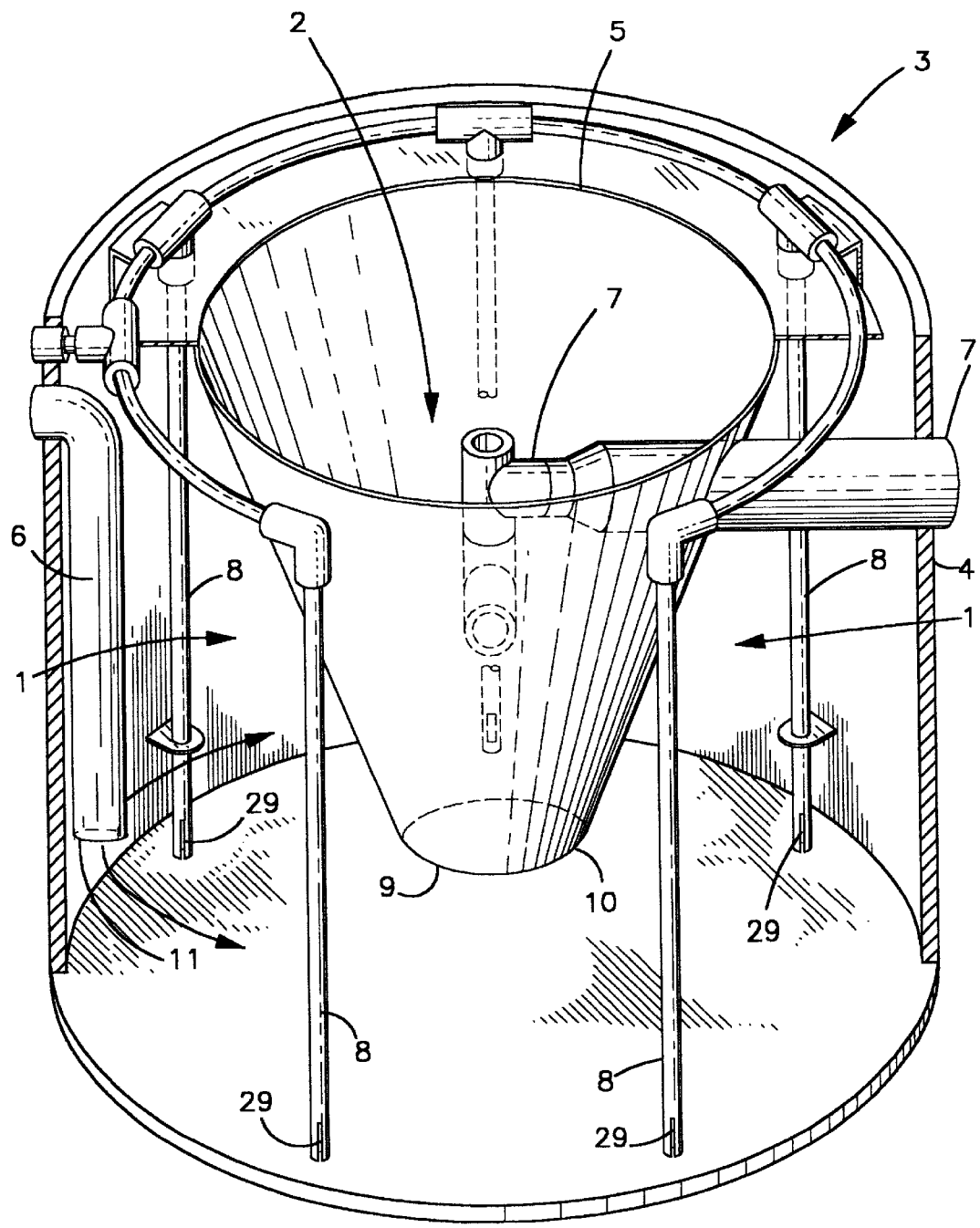
FIG. 2 illustrates a wastewater treatment apparatus that has the wastewater inlet positioned near the bottom of the tank.
Figure 3:
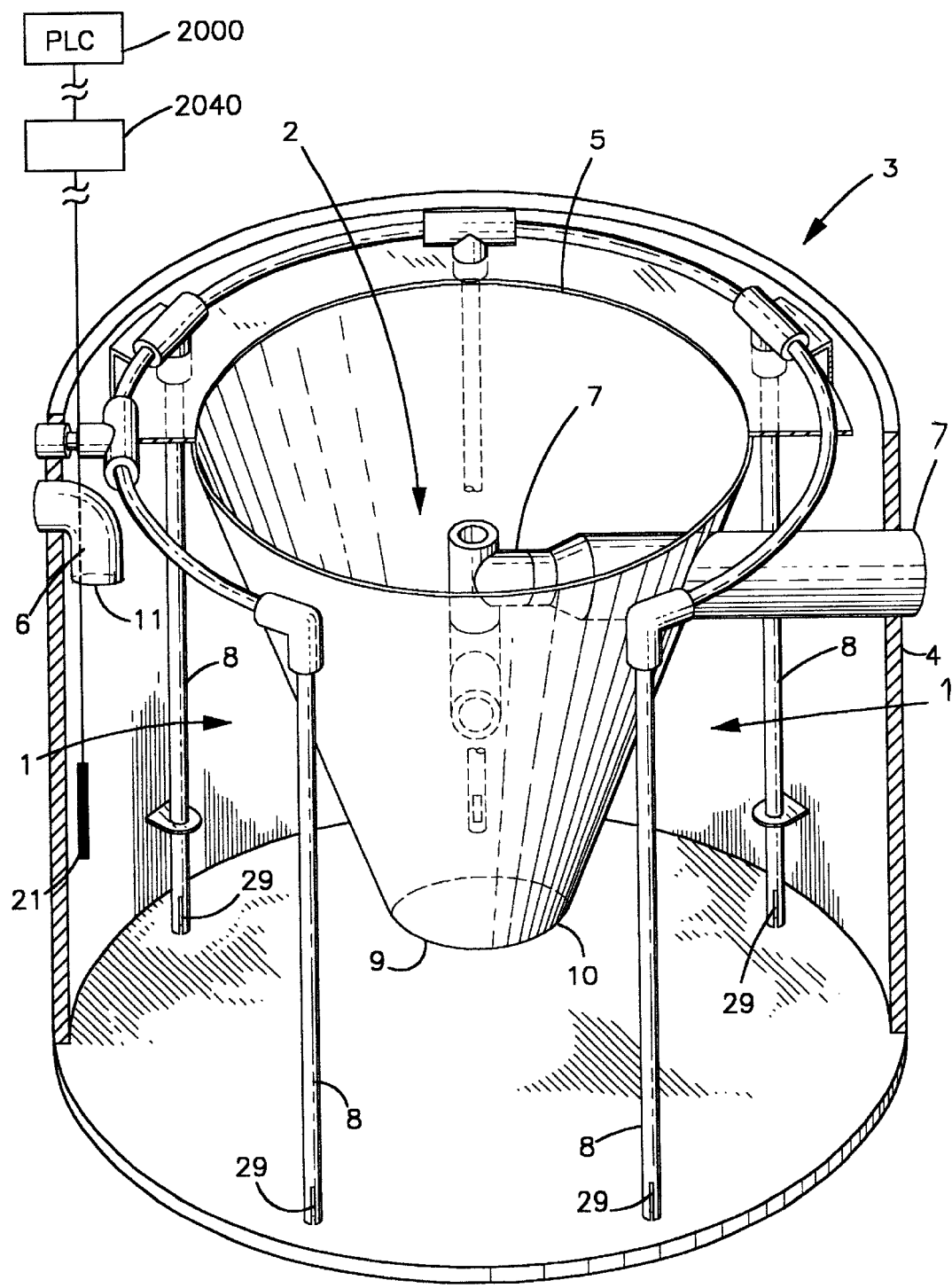
FIG. 3 illustrates a wastewater treatment apparatus that includes a DO probe.

The present invention may be used in a variety of wastewater treatment applications and apparatuses that are configured to define an aeration zone 1 and a quiescent zone 2. An example of such an apparatus 3 is shown in FIGS. 1–3. The construction and conventional operation of a suitable apparatus 3 is discussed in detail in U.S. Pat Nos. 5,490,935 and 5,714,061 that are incorporated by reference.

Viewing FIG. 1, apparatus 3 comprises a tank 4 with a hopper 5 positioned therein. The area within hopper 5 defines quiescent zone 2, and the area between hopper 5 and tank 4 defines aeration zone 1. An opening 9 within the lower end 10 of hopper 5 allows fluid communication between zones 1 and 2. Apparatus 3 also comprises a wastewater inlet 6 and a wastewater outlet 7 positioned within quiescent zone 2 and extending from apparatus 3. One or more air drops 8 having gas outlets 29 are positioned within aeration zone 1 to deliver a gas, preferably air, from a source of gas (not shown), such as an air compressor, into aeration zone 1.

Wastewater enters apparatus 3 through inlet 6 where it is aerated in aeration zone 1 before eventually flowing into quiescent zone 2 where substantially all suspended particles within the wastewater settle out before the wastewater exits through outlet 7.

Many wastewater systems experience periods of heavy influent flow where the flow rate of the entering wastewater is increased. These periods of heavy flow (also referred to as diurnal flow) usually occur in the morning and in the evening when most people are at their homes and using more water than at other periods during the day.

During diurnal flow, the DO levels in aeration zone 1 are reduced because bacteria within the wastewater consumes oxygen in metabolizing the increased BOD levels of the influent wastewater. Because DO levels in the aeration chamber decrease during periods of heavy flow (and consequently high BOD), these heavy flow periods are ideal for nitrate removal because the amount of oxygen available for BOD metabolism is decreased. Consequently, bacteria gravitate toward nitrate metabolism. While the use of the present invention during diurnal flow is preferred, the methods may also be used outside of the periods of diurnal flow.

One method for reducing the nitrate concentration of wastewater in a wastewater treatment apparatus 3 is ceasing the gas (preferably air) flow into apparatus 3 for a predetermined nitrate reduction period during heavy flow intervals or when the DO level in the wastewater in aeration zone I reaches a first predetermined threshold, usually at or below about 2.0 mg/l. It is believed that a threshold level below 1.0 mg/l is preferred. The predetermined nitrate reduction period can vary by apparatus, but predetermined nitrate reduction period preferably lasts between about 1 and about 2 hours (for a 500 gallon tank 4) or other time sufficient to substantially reduce the nitrate concentration of the wastewater.

The method for reducing nitrate concentration of wastewater may also include a mixing step to ensure that some of the particles that settle during the nitrate reduction period are re-suspended in aeration zone 1. Preferably, the wastewater in aeration zone 1 is mixed so that particles in the wastewater do not settle and are efficiently metabolized during the de-nitrification process. The efficiency of the present methods is increased when the bacteria are circulated throughout aeration zone 1 to allow de-nitrification to occur throughout aeration zone 1 (as opposed to being concentrated at the bottom of tank 4).

The mixing step can be performed in a variety of ways. In one embodiment, gas is intermittently flowed through gas outlets 29, such as by (1) pulsing gas through at least one gas outlet 29 at predetermined mixing intervals and/or for predetermined mixing periods; (2) flowing a sufficient amount of gas through at least one gas outlet 29 at a sufficient flow rate to re-suspend most of the settled particles within the wastewater; and/or, (3) continuously flowing gas through at least one gas outlet 29 at a predetermined mixing interval for a predetermined mixing period.

Figure 4A:
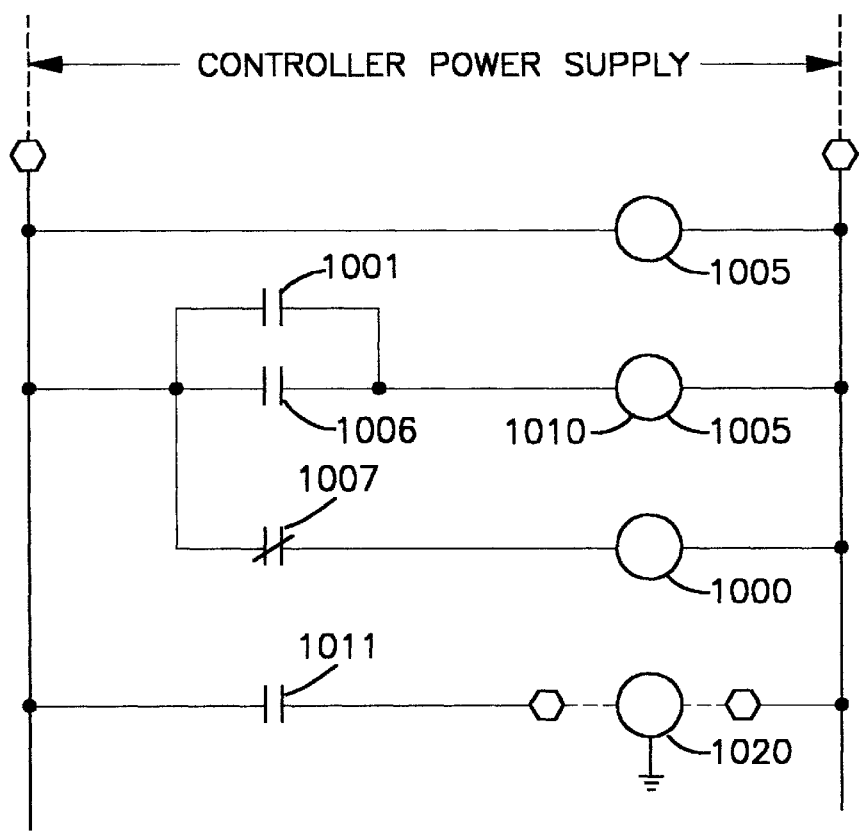
FIG. 4a illustrates a schematic of an embodiment of the timer/repeat cycle timer control system.

Viewing FIG. 4a, the pulsing or intermittent flow through gas outlets 29 can be accomplished using: (1) a clock timer 1005 or other means to control the start of the de-nitrification sequence (e.g., shutting off the gas (air) source or reducing the air supply); and, (2) a repeat cycle timer 1000 or other device to periodically pulse the air source for flow. The control system shown in FIG. 4a comprises a repeat cycle timer 1000 and associated contacts 1001, a clock timer 1005 and associated contacts 1006 and 1007, a controller 1010 and associated contacts 1011, and a source of gas (air), preferably a compressor 1020.

When controller contacts 1011 are closed, power is provided to compressor 1020, and compressor 1020 flows air through gas outlets 29. Power is provided to controller 1010 when clock contact 1006 is closed (and consequently clock contact 1007 is open) or when clock contact 1006 is open. When clock contact 1006 is open, clock contact 1007 is closed, thereby providing power to repeat cycle timer 1000 to periodically (at the predetermined mixing intervals) close contact 1001 for specific periods of time (predetermined mixing periods). In turn, power is provided to controller 1010 and compressor 1020, thereby regulating flow through air drops 8 and gas outlets 29. Accordingly, both timer 1005 and repeat cycle timer 1010 are adapted to regulate the air flow from compressor 1020 to gas outlets 29 by controlling the power input to compressor 1020.

When apparatus 3 is configured to flow gas into aeration zone 1 at predetermined mixing intervals, the predetermined mixing intervals are sufficiently spaced so that suspended particles within the wastewater in aeration zone 1 do not settle, preferably between about 10 and about 20 minutes. At the beginning or end of each predetermined mixing interval, gas flows through at least one gas outlet 29 for a predetermined mixing period, preferably long enough to sufficiently mix the wastewater in aeration zone 1, but not long enough to substantially raise DO levels. Air for mixing can be supplied through one of the air outlets 29, or through a separate line. For a 500-gallon tank 4, a preferred predetermined mixing period is about 1 minute.

In alternative embodiments, mixing can be provided by propellers within aeration zone 1, pumps, or other means to stir the wastewater in aeration zone 1. A simple means of stirring or mixing the wastewater step may be accomplished by suitably positioning wastewater inlet 6 so that the incoming flow of wastewater creates a current (shown by the arrows in FIG. 2) to accomplish the desired mixing.

A suitable embodiment is shown in FIG. 2, where the inlet end 11 of wastewater inlet 6 is positioned near the bottom of tank 4. Inlet end 11 is positioned so that wastewater flowing from inlet end 11 does not pass into quiescent zone 2 through opening 9 until after it has been treated in aeration zone 1. When positioned near the bottom of tank 4, inlet end 11 should not be positioned so that incoming wastewater is directed toward opening 9. Placing inlet end 11 so that incoming wastewater flows tangentially to the walls of tank 4 prevents these problems. Alternatively, the mixing may be accomplished by combining some of the above means, such as placing inlet end 11 near the tank bottom and pulsing air into aeration zone 1 during the de-nitrification process.

Viewing FIG. 3, apparatus 3 may further comprise a probe 21 that monitors and measures DO levels in aeration zone 1 and is in communication with a source of air (compressor 1020) using a valve, relay, solenoid or other suitable device to regulate or cease air flow through outlets 29. A suitable DO probe 21 is model TEll Flouroprobe and Meter available from Tipton Environmental Inc. of Milford, Ohio. The air flow through air drops 8 ceases when probe 21 has detected a predetermined DO level or a predetermined change in DO level.

The predetermined change in DO levels may be a 10–20 percent change between measurements. Alternatively, the predetermined change in DO levels may be a 15 percent change over a running average of the measured DO levels for a twenty-minute period (the background level) when compared with the running average over a shorter period (e.g., 5 minutes).

Figure 4B:
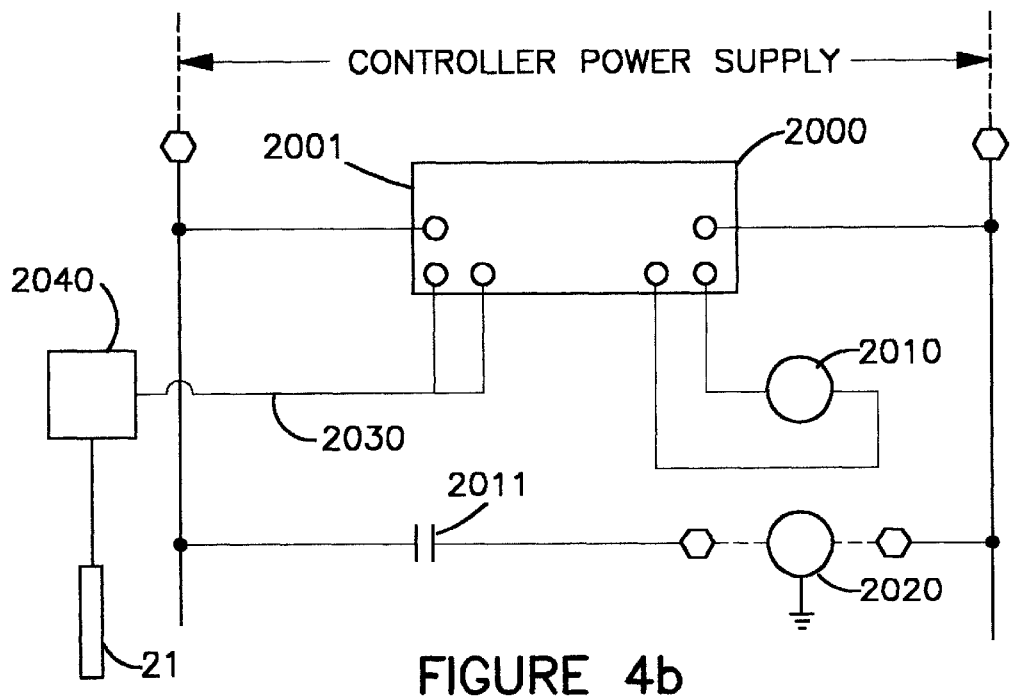
FIG. 4b illustrates a schematic of an embodiment of the programmed logic controller-DO input control system.

Referring to FIG. 4b, control of the process may be provided by a first controller 2001, such as programmable logic controller (PLC) 2000, and any included or associated memory storage devices. DO probe 21, through DO meter 2040, outputs a signal 2030 to PLC 2000. PLC 2000 then operates compressor controller 2010 to close contact 2011 to operate a compressor 2020 to regulate the air flow from compressor 2020 by controlling the power supply to compressor 2020. PLC 2000 may have associated memory to record DO measurements for using the measurements in calculations (e.g., determining background DO levels). PLC 2000 should also have an internal clock or associated with an external clock (not shown) so that PLC 2000 can pulse compressor controller 2010 as needed (and if desired) during de-nitrification, or simply power-up compressor controller 2010 after a predetermined time interval, such as the predetermined mixing interval.

Air flow through air drops 8 may resume when a second predetermined threshold is reached. Second predetermined threshold may comprise a time period, a subsequent DO level, or predetermined percent change between subsequent DO levels or a plurality of sequential DO levels. In terms of time, second predetermined threshold may equal the predetermined nitrate reduction period, approximately 1–2 hours. The second predetermined threshold may also equal a subsequent DO measurement, about 1.0 mg/l or less, a subsequent predetermined percent change between subsequent DO measurements, or a subsequent predetermined percent change over a plurality of DO measurements. The second predetermined threshold is preferably the predetermined nitrate reduction period because low DO level measurements may be erratic and/or unreliable.

The present methods may take a variety of combinations of the different steps described herein. For example, the present method may comprise ceasing gas flow for a predetermined nitrate reduction period. The present method may comprise ceasing airflow into apparatus 3 and mixing the wastewater in aeration zone 1. The present method may comprise monitoring the DO levels, ceasing gas flow when a predetermined DO level has been reached, and resuming gas flow when a second predetermined threshold has been reached, with no mixing involved. Finally, the method may comprise monitoring the DO levels, ceasing air flow into the aeration zone when the DO level has reached a first predetermined threshold, and mixing wastewater in aeration zone 1.

Unlike prior art methods, the present method may be used as wastewater continuously flows into apparatus 3 eliminating the necessity of ceasing flow into the wastewater treatment system during the nitrate reduction period. The embodiments described herein are designed so that apparatus 3 may accept incoming wastewater without requiring sequential batch processing or storage of influent during de-nitrification.

Although the preferred embodiment has been described, it will be appreciated by those skilled in the art to that the present invention pertains that modifications, changes, and improvements may be made without departing from the spirit of the invention defined by the claims.

What is claimed is:

1. A wastewater treatment apparatus configured to have an aeration zone and a quiescent zone, said apparatus comprising:

(a) at least one gas outlet positioned in said aeration zone, said gas outlet fluidly connected to a source of gas;

(b) a dissolved oxygen probe positioned in said aeration zone;

(c) a first controller adapted to regulate gas flow from said source of gas, said dissolved oxygen probe providing a dissolved oxygen measurement that is input to said first controller; and (d) said first controller operatively connected to said gas source, said first controller being configured to interrupt said gas flow to said gas outlet for a first period of time when said dissolved oxygen measurement falls below a first predetermined level.

2. A wastewater treatment system according to claim 1 wherein said first controller further comprises a memory storage device to store said dissolved oxygen measurements for a predetermined period of time.

3. A wastewater treatment apparatus according to claim 1 wherein said first predetermined level is a dissolved oxygen reading of about 2.0 mg/l or less.

4. A wastewater treatment apparatus as in claim 1 further configured to provide intermittent gas flow for a second period to said gas outlets during said nitrate reduction, said second period being of length so that said dissolved oxygen measurements do not substantially rise during said first period.

5. A wastewater treatment apparatus according to claim 4 where said second period is about one minute in duration.

6. A wastewater treatment apparatus as in claim 5 where said dissolved oxygen measurements during said second period do not rise above said predetermined level.

7. A wastewater treatment apparatus according to claim 6 wherein said dissolved oxygen measurements during said second period do not rise above said predetermined level.

8. A wastewater treatment apparatus having a tank configured to define an aeration zone and a quiescent zone, gas said apparatus comprising:

(a) one or more gas outlets positioned in said aeration zone;

(b) a timer adapted to regulate gas flow from a source of gas to said gas outlets;

(c) a repeat cycle timer adapted to regulate gas flow from said source of gas to said gas outlets; and (d) whereby when said timer suspends gas flow into said gas outlets, said repeat cycle timer permits gas flow to said gas outlets at predetermined mixing intervals for predetermined mixing periods, whereby said predetermined mixing periods are of length sufficient to mix wastewater when contained in said aeration zone without substantially raising the dissolved oxygen level of said wastewater in said aeration chamber.

9. The apparatus according to claim 8 further comprising a dissolved oxygen monitor positioned within said aeration zone.

10. A wastewater treatment apparatus configured to have an aeration zone and a quiescent zone, said apparatus comprising:

a. at least one gas outlet positioned in said aeration zone, said gas outlet fluidly connected to a source of gas;

(b) a dissolved oxygen probe positioned in said aeration zone;

(c) a first controller adapted to regulate gas flow from said source of gas, said dissolved oxygen probe providing a dissolved oxygen measurement that is input to said first controller; and (d) said first controller being configured to intemipt said gas flow to said gas outlet for a predetermined nitrate reduction period, to provide intermittent gas flow to said gas outlets, said intermittent gas flow being of length so that said dissolved oxygen measurements do not substantially rise.

11. A wastewater treatment apparatus configured to have an aeration zone and a quiescent zone, said apparatus comprising:

(a) at least one gas outlet positioned in said aeration zone, said gas outlet fluidly connected to a source of gas;

(b) a dissolved oxygen probe positioned in said aeration zone;

(c) a first controller adapted to regulate gas flow from said source of gas, said dissolved oxygen probe providing dissolved oxygen measurements that are input to said first controller; and (d) a memory device for recording said dissolved oxygen measurements, said first controller operatively connected to said gas source, said first controller being configured to interrupt said gas flow to said gas outlet for a predetermined nitrate reduction when said dissolved oxygen measurement is reduced by a specified percentage.

12. Apparatus according to claim 11 where said percentage reduction is at least about a 10 percent reduction.

13. A wastewater treatment apparatus configured to have an aeration zone and a quiescent zone, said apparatus comprising:

(a) at least one gas outlet positioned in said aeration zone, said gas outlet fluidly connected to a source of gas;

(b) a dissolved oxygen probe positioned in said aeration zone;

(c) a first controller adapted to regulate gas flow from said source of gas, said dissolved oxygen probe providing dissolved oxygen measurements that are input to said first controller; and (d) a memory device for recording said dissolved oxygen measurements, said said first controller operatively connected to said gas source, said first controller adapted to mathematically manipulate said dissolved oxygen measurements, said controller being configured to interrupt said gas flow to said gas outlet for a predetermined nitrate reduction period when said mathematically manipulated dissolved oxygen measurements are reduced by a specified percentage.

14. Apparatus according to claim 13 where said percentage reduction is at least about a 15 percent reduction.

\* \* \* \* \*